United States Patent
Azuma et al.

(10) Patent No.: US 11,912,225 B2
(45) Date of Patent: Feb. 27, 2024

(54) SIDE AIRBAG DEVICE

(71) Applicant: ASHIMORI INDUSTRY CO., LTD., Settsu (JP)

(72) Inventors: Hidetaka Azuma, Settsu (JP); Yuta Minami, Settsu (JP); Yoshitaka Okagami, Settsu (JP); Kazuya Hashimoto, Settsu (JP)

(73) Assignee: ASHIMORI INDUSTRY CO., LTD., Settsu (JP)

( * ) Notice: Subject to any disclaimer, the term of this patent is extended or adjusted under 35 U.S.C. 154(b) by 28 days.

(21) Appl. No.: 17/615,988

(22) PCT Filed: Jun. 10, 2020

(86) PCT No.: PCT/JP2020/022807
§ 371 (c)(1),
(2) Date: Dec. 2, 2021

(87) PCT Pub. No.: WO2020/255817
PCT Pub. Date: Dec. 24, 2020

(65) Prior Publication Data
US 2022/0355756 A1 Nov. 10, 2022

(30) Foreign Application Priority Data
Jun. 20, 2019 (JP) .................. 2019-114698

(51) Int. Cl.
*B60R 21/207* (2006.01)
*B60R 21/231* (2011.01)
*B60R 21/233* (2006.01)

(52) U.S. Cl.
CPC ...... *B60R 21/207* (2013.01); *B60R 21/23138* (2013.01); *B60R 21/233* (2013.01); *B60R 2021/23146* (2013.01)

(58) Field of Classification Search
CPC ............ B60R 21/207; B60R 21/23138; B60R 21/233; B60R 2021/23146;
(Continued)

(56) References Cited

U.S. PATENT DOCUMENTS 5,730,464 A * 3/1998 Hill ................... B60R 21/23138
280/730.2
5,791,685 A 8/1998 Lachat et al.
(Continued)

FOREIGN PATENT DOCUMENTS

DE 102014014028 A1 * 3/2016 ........... B60R 21/237
DE 10 2017 117 103 A1 1/2019
(Continued)

OTHER PUBLICATIONS

Murakami, JP10-181498 English Machine Translation, ip.com (Year: 1998).*

(Continued)

*Primary Examiner* — Karen Beck
(74) *Attorney, Agent, or Firm* — Oblon, McClelland, Maier & Neustadt, L.L.P.

(57) ABSTRACT

A side airbag device capable of restricting an occupant from moving to the inner side in the vehicle width direction while restraining the head of the occupant is inflatable and deployable in a space beside an occupant seated in a vehicle seat. The side airbag device includes an inflator configured to generate a gas and a bag-shaped airbag inflatable and deployable in response to the gas upon activation of the inflator to protect a lateral portion of the occupant. The airbag includes a torso protection portion, and a head protection portion configured to be provided above the torso protection portion and inflatable and deployable between an upper portion of a shoulder of the occupant and a lateral portion of a head of the occupant. The head protection (Continued)

portion is bendable at an acute angle relative to the torso protection portion in an inflated and deployed state of the airbag.

12 Claims, 13 Drawing Sheets

(58) Field of Classification Search
CPC .. B60R 2021/0048; B60R 2021/23386; B60R 21/2338
See application file for complete search history.

(56) References Cited

U.S. PATENT DOCUMENTS

| | | | |
|---|---|---|---|
| 2006/0103119 A1 | 5/2006 | Kurimoto et al. | |
| 2009/0079171 A1* | 3/2009 | Dix | B60R 21/23138 280/730.2 |
| 2012/0091695 A1 | 4/2012 | Richez et al. | |
| 2014/0151984 A1* | 6/2014 | Fukawatase | B60R 21/23138 280/730.2 |
| 2015/0197212 A1* | 7/2015 | Fujiwara | B60R 21/261 280/729 |
| 2015/0367806 A1* | 12/2015 | Fujiwara | B60R 21/233 280/729 |
| 2016/0355155 A1* | 12/2016 | Perez Garcia | B60R 21/23138 |
| 2017/0043741 A1* | 2/2017 | Kobayashi | B60N 2/42 |
| 2017/0129446 A1 | 5/2017 | Kobayashi et al. | |
| 2019/0389421 A1 | 12/2019 | Sturm et al. | |
| 2020/0001819 A1* | 1/2020 | Moon | B60R 21/2338 |
| 2021/0170978 A1 | 6/2021 | Acker et al. | |
| 2021/0300294 A1* | 9/2021 | Azuma | B60R 21/207 |
| 2022/0242356 A1* | 8/2022 | Bogdanovic | B60R 21/23138 |

FOREIGN PATENT DOCUMENTS

| | | | |
|---|---|---|---|
| DE | 10 2018 101 395 A1 | 7/2019 | |
| DE | 10 2018 108 171 A1 | 10/2019 | |
| DE | 102018108171 A1 * | 10/2019 | B60R 21/207 |
| EP | 3 778 310 A1 | 2/2021 | |
| JP | 9-39710 A | 2/1997 | |
| JP | 10181498 A * | 7/1998 | B60R 21/23138 |
| JP | 2006-142861 A | 6/2006 | |
| JP | 2014-108740 A | 6/2014 | |
| WO | WO 2015/198739 A1 | 12/2015 | |
| WO | WO 2019/145199 A1 | 8/2019 | |
| WO | WO 2019/193082 A1 | 10/2019 | |
| WO | WO 2019/193987 A1 | 10/2019 | |
| WO | WO-2022255516 A1 * | 12/2022 | |

OTHER PUBLICATIONS

Acker, DE10 2018 108171 English Machine Translation, ip.com (Year: 2019).*

* cited by examiner

SIDE AIRBAG DEVICE

TECHNICAL FIELD

The present invention relates to side airbag devices. The present invention specifically relates to a side airbag device that is inflatable and deployable in a space beside an occupant upon a lateral collision of a vehicle such as an automobile.

BACKGROUND ART

Side airbag devices are known to prevent an occupant, in a lateral collision of a vehicle, from moving to an inner side in a vehicle width direction and coming into contact with an occupant seated in the next seat.

For example, Patent Literature 1 discloses a side airbag device which is intended to provide an enhanced function of protecting an occupant using its airbag. This side airbag device is described to use a tensioned tether attached to an outer surface of the airbag on a side that faces the occupant when deployed so as to prevent the airbag from rotating in a direction separating from a seat when the occupant collides with the airbag after inflation and deployment.

CITATION LIST

Patent Literature

Patent Literature 1: WO 2015/198739

SUMMARY OF INVENTION

Technical Problem

The side airbag device disclosed in Patent Literature 1 is described to prevent the airbag from rotating in a direction separating from a seat and thereby restrict the movement of the occupant to the inner side in the vehicle width direction, particularly the movement of the torso of the occupant to the inner side in the vehicle width direction. However, since there is a gap between the head and a shoulder of the occupant in the vehicle width direction, restricting the torso of the occupant from moving to the inner side in the vehicle width direction causes the head of the occupant to rotate toward the airbag.

The present invention has been made under the current situation in the art and aims to provide a side airbag device capable of restricting an occupant from moving to the inner side in the vehicle width direction while restraining the head of the occupant.

Solution to Problem

One aspect of the present invention relates to a side airbag device inflatable and deployable in a space beside an occupant seated in a vehicle seat, the side airbag device including: an inflator configured to generate a gas; and a bag-shaped airbag inflatable and deployable in response to the gas upon activation of the inflator to protect a lateral portion of the occupant, the airbag including a torso protection portion inflatable and deployable in a space beside a torso of the occupant and a head protection portion provided above the torso protection portion and inflatable and deployable between an upper portion of a shoulder of the occupant and a lateral portion of a head of the occupant, the head protection portion being bendable at an acute angle relative to the torso protection portion in an inflated and deployed state.

Another aspect of the present invention relates to a side airbag device inflatable and deployable in a space beside an occupant seated in a vehicle seat, the side airbag device including: an inflator configured to generate a gas; and a bag-shaped airbag inflatable and deployable in response to the gas upon activation of the inflator to protect a lateral portion of the occupant, the airbag including a torso protection portion inflatable and deployable in a space beside a torso of the occupant and a head protection portion provided above the torso protection portion and inflatable and deployable between an upper portion of a shoulder of the occupant and a lateral portion of a head of the occupant, the airbag being provided with a main bag which defines the torso protection portion, a sub bag which defines the head protection portion, and a gas flow hole which communicates the main bag and the sub bag, the sub bag being fixed to an upper end portion of the main bag with a base end portion of the sub bag surrounding the gas flow hole and, in the airbag in a folded state before inflation and deployment, the sub bag is overlaid with the main bag from the upper end portion of the main bag to a middle portion on the occupant side of the main bag, the sub bag in the airbag in the folded state before the inflation and deployment being folded back toward the occupant along a vehicle front-rear direction.

Advantageous Effects of Invention

The present invention can provide a side airbag device capable of restricting an occupant from moving to the inner side in the vehicle width direction while restraining the head of the occupant.

DESCRIPTION OF EMBODIMENTS

The directions herein are described relative to a vehicle unless otherwise mentioned. For example, the "front side" indicates a side based on the forward direction of the vehicle; the "rear side" indicates a side based on the backward direction of the vehicle; the "upper side" indicates a side based on the upward direction of the vehicle; the "lower side" indicates a side based on the downward direction of the vehicle; and the "lateral side" indicates a side based on the inward direction of a vehicle width direction. The arrow FR, the arrow UP, and the arrow IN drawn in the figures as appropriate respectively indicate the forward direction of the vehicle, the upward direction of the vehicle, and the inward direction of the vehicle width direction. The members placed inside a vehicle seat are illustrated in see-through figures of the vehicle seat.

Embodiment 1

Hereinafter, a side airbag device of Embodiment 1 of the present invention is described with reference to the drawings.

(Before Inflation and Deployment)

Figure 1:
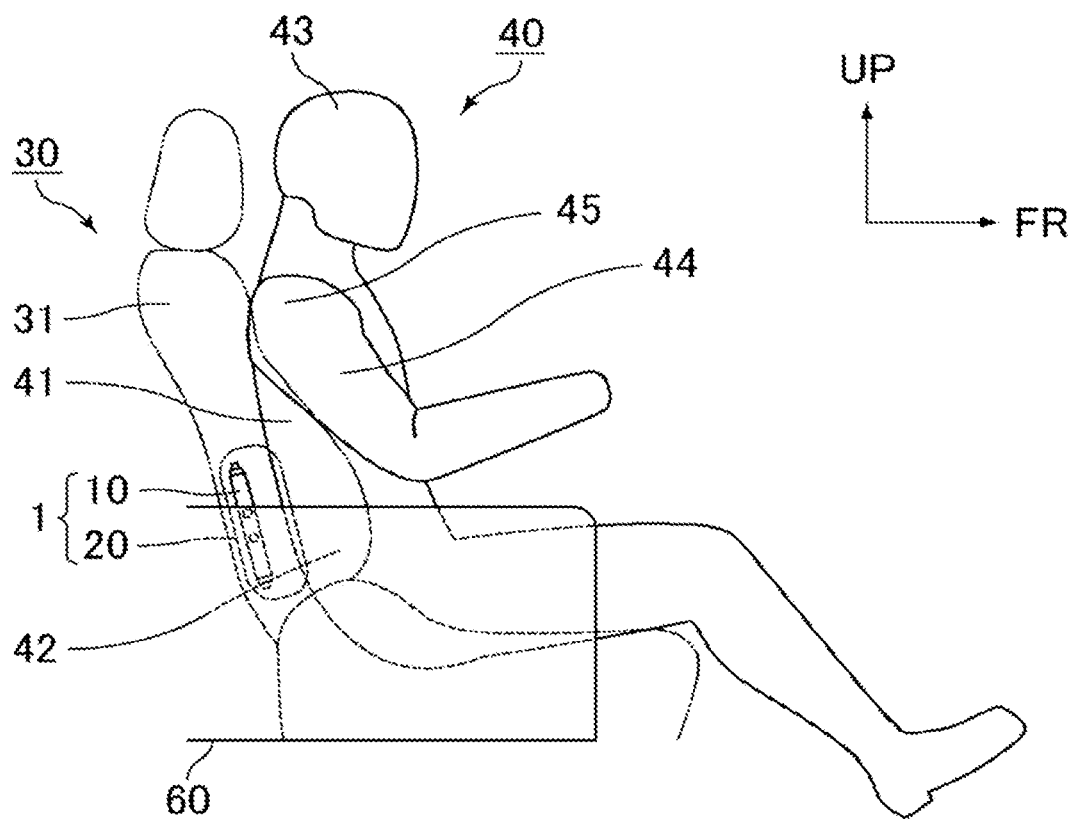
FIG. 1 is a schematic side view of a side airbag device of Embodiment 1 before inflation and deployment of an airbag.
Figure 2:
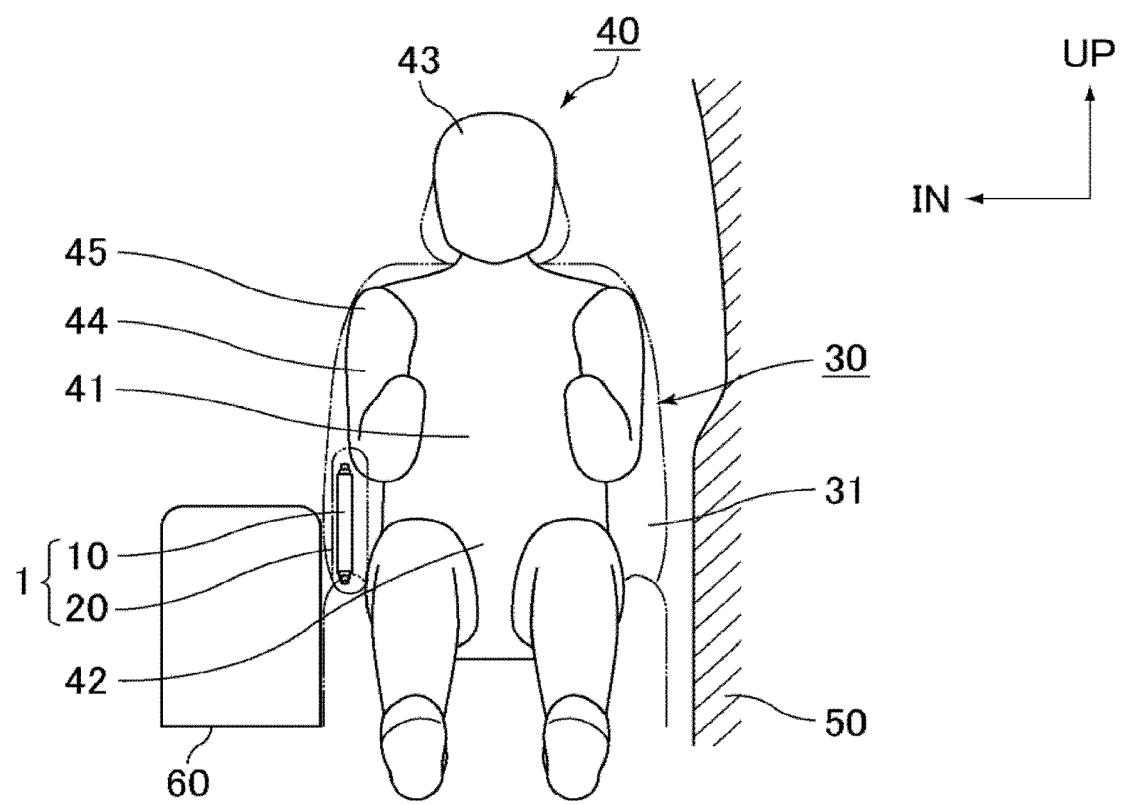
FIG. 2 is a schematic front view of the side airbag device of Embodiment 1 before the inflation and deployment of the airbag.

FIG. 1 is a schematic side view of the side airbag device of Embodiment 1 before inflation and deployment of an airbag. FIG. 2 is a schematic front view of the side airbag device of Embodiment 1 before the inflation and deployment of the airbag.

As shown in FIG. 1 and FIG. 2, a side airbag device 1 is fixed to a lateral portion (lateral portion on an inner side in a vehicle width direction) of a seatback (backrest) 31 of a vehicle seat 30.

The vehicle seat 30 may be a driver's seat or a passenger seat of a vehicle, for example.

The side airbag device 1 includes an inflator 10 and an airbag 20.

The inflator 10 is provided internally in the airbag 20. The inflator 10 is a cylindrical (columnar) gas-generating device, and is provided in the extending direction (height direction) of the seatback 31. A pair of bolts protrudes from upper and lower portions of the inflator 10, and this pair of bolts penetrates the airbag 20. The bolts fix the inflator 10 to the lateral portion (e.g., side frame) of the seatback 31. The inflator 10 may be fixed to the seating surface of the seat, not to the seatback 31.

The inflator 10 is activated in a lateral collision of a vehicle. Specifically, first, when an impact sensor mounted on the vehicle detects the lateral collision of the vehicle, the sensor transmits a signal to an electronic control unit (ECU) and the ECU calculates and determines the collision level. If the determined collision level corresponds to a level at which the airbag 20 should be inflated, the inflator 10 is ignited to generate a gas by a chemical reaction due to combustion. The gas generated in the inflator 10 is then introduced into the airbag 20.

The inflator 10 may be of any type, and may be a pyrotechnic inflator which utilizes a gas generated by combusting a gas-generating agent, a stored gas inflator utilizing a compressed gas, or a hybrid inflator utilizing a gas mixture of a gas generated by combusting a gas-generating agent and a compressed gas, for example.

The airbag 20 has a bag shape and is, before the inflation and deployment, fixed in the folded state to the lateral portion of the seatback 31 (e.g., side frame) and stored together with a cushion pad while being covered with an outer layer of the seatback 31.

In the present embodiment, a world side impact dummy (World-SID) 40 is seated in the vehicle seat 30. The sitting position of the world side impact dummy 40 is in conformity with the side impact test (ECE R95) used in Japan and Europe or the side impact test (FMVSS214) used in the U.S. at present. The position and size of the airbag 20 in the inflated and deployed state are determined in accordance with the positions of parts such as a torso 41, a hip 42, a head 43, an arm 44, and a shoulder 45 of the world side impact dummy 40 shown in FIG. 1. The world side impact dummy 40 is hereinafter referred to as the "occupant 40".

A vehicle sidewall 50 may be any vehicle part placed on the outer side in the vehicle width direction relative to the occupant 40 seated in the vehicle seat 30 (the side opposing a console box 60), and collectively refers to parts such as side doors, pillars, and side windows.

The console box 60 is disposed on the inner side in the vehicle width direction relative to the vehicle seat 30. For example, the console box 60 is disposed in the central portion in the vehicle width direction between the driver's seat and the passenger seat. The console box 60 may function as an armrest that supports the arm 44 of the occupant 40 on the inner side in the vehicle width direction.

(Occupant Restraint)

Figure 3:
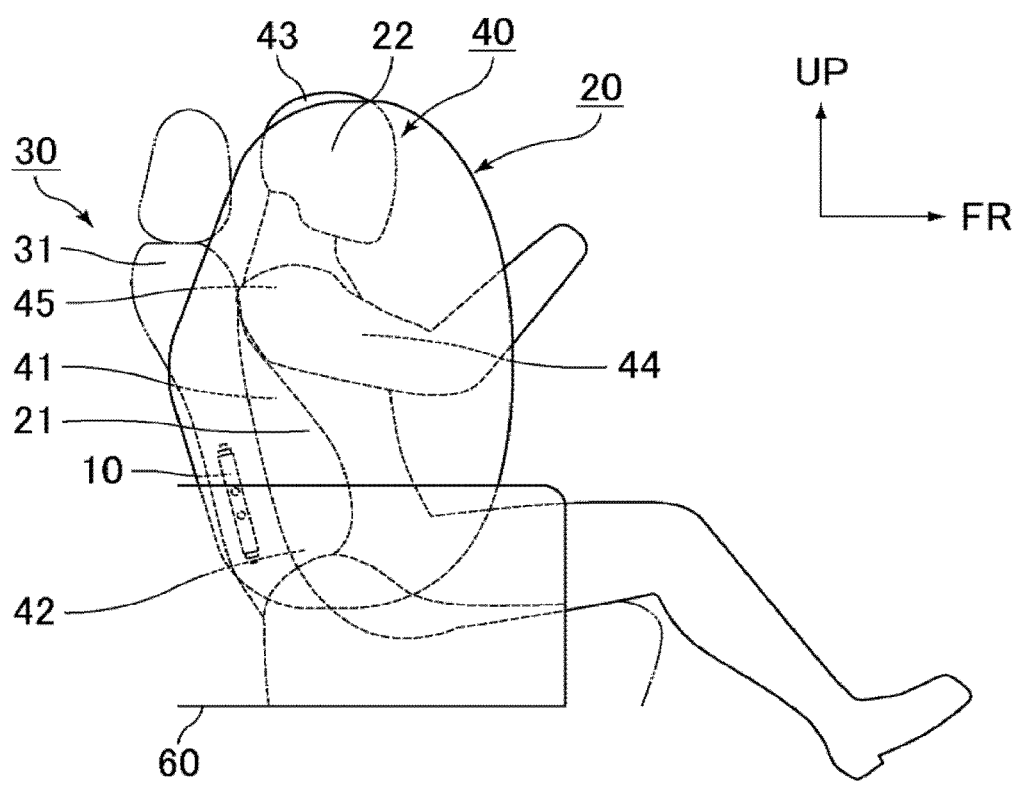
FIG. 3 is a schematic side view of the side airbag device of Embodiment 1 when an occupant is restrained by the airbag.
Figure 4:
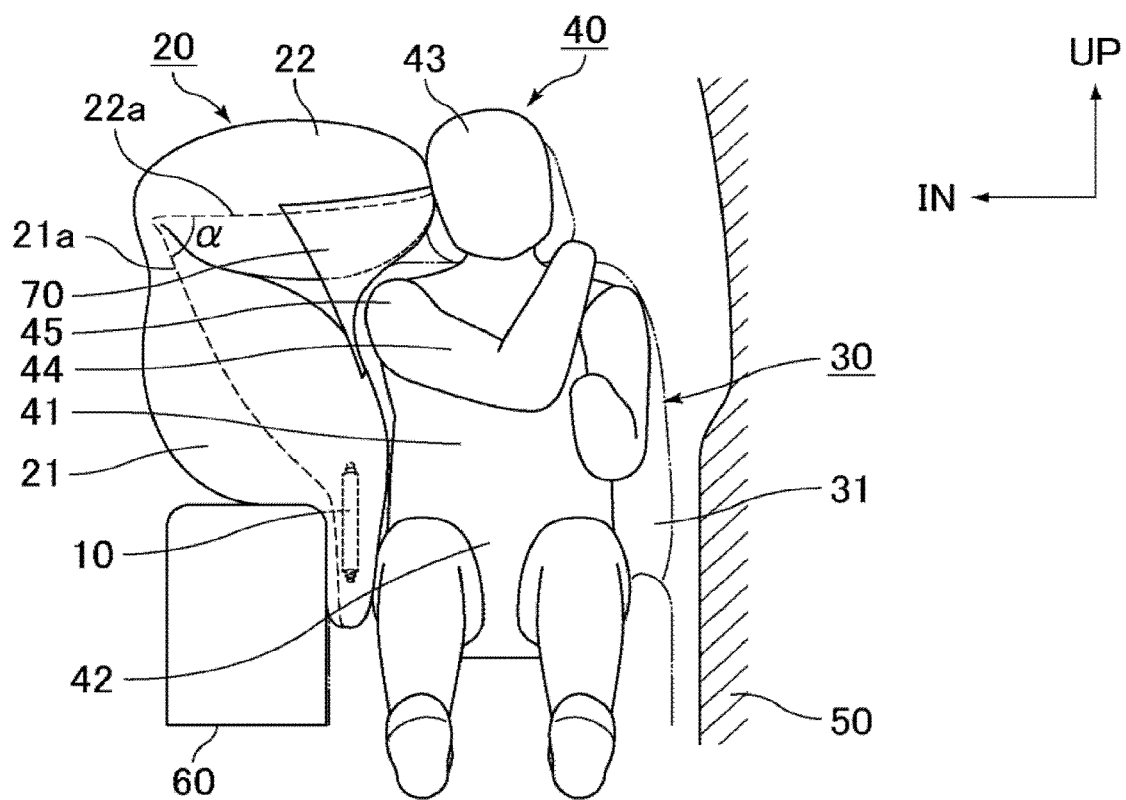
FIG. 4 is a schematic front view of the side airbag device of Embodiment 1 when an occupant is restrained by the airbag.

FIG. 3 is a schematic side view of the side airbag device of Embodiment 1 when an occupant is restrained by the airbag. FIG. 4 is a schematic front view of the side airbag device of Embodiment 1 when an occupant is restrained by the airbag.

When a vehicle has a lateral collision with an obstacle (e.g., another vehicle), specifically, when an obstacle collides with a vehicle sidewall opposing the vehicle sidewall 50 in the vehicle width direction (when the vehicle seat 30 is the driver's seat, the vehicle body portion on the outer side in the vehicle width direction relative to the passenger seat) and the inflator 10 is activated, the gas generated by the inflator 10 is introduced into the airbag 20 and the airbag 20 inflates while unfolded. The force applied from the inflated airbag 20 then tears open the outer layer of the seatback 31.

Thereby, as shown in FIG. 3 and FIG. 4, the airbag 20 inflates and deploys in a space above the console box 60 and beside the occupant 40 seated in the vehicle seat 30 to protect the lateral portion of the occupant 40. The airbag 20 configured to inflate and deploy in this manner is also referred to as a far-side airbag.

In a lateral collision of the vehicle, the airbag 20 inflates and deploys to form a torso protection portion 21 and a head protection portion 22.

The torso protection portion 21 inflates and deploys in a space beside the torso 41 of the occupant 40.

The head protection portion 22 is provided above the torso protection portion 21 and inflates and deploys between the upper portion of the shoulder 45 of the occupant 40 and the lateral portion of the head 43 of the occupant 40.

The head protection portion 22 is bent at an acute angle relative to the torso protection portion 21 in the inflated and deployed state. The expression "the head protection portion 22 is bent at an acute angle relative to the torso protection portion 21" means that in a front view of the airbag 20, an angle α formed by a join line 21*a* (e.g., sewing line) of a base fabric piece defining the torso protection portion 21 and a join line 22*a* (e.g., sewing line) of a base fabric piece defining the head protection portion 22 is an acute angle, i.e., α<90°. FIG. 4 shows a state where the join line 21*a* and the join line 22*a* each are a curved line, not a straight line. Such curved lines are also acceptable as long as the substantial extension direction of the join line 21*a* and the substantial extension direction of the join line 22*a* form an acute angle in the vicinity of the portion where the join line 21*a* and the join line 22*a* are in contact with each other. Also, FIG. 4 shows a state where the occupant 40 is seated in the vehicle seat 30. Yet, the head protection portion 22 has only to be bent at an acute angle relative to the torso protection portion 21 in the inflated and deployed state in the absence of the occupant 40 (which is also referred to as the "spontaneously inflated and deployed state").

In a lateral collision of the vehicle, the occupant 40 seated in the vehicle seat 30 moves to the inner side in the vehicle width direction. The airbag 20 inflates and deploys to allow the torso protection portion 21 to restrain the torso 41, i.e., the portion lower than the shoulder 45, of the moving occupant 40. The restraint of the torso 41 of the occupant 40 by the torso protection portion 21 causes the head 43 of the occupant 40 to turn toward the airbag 20. The head protection portion 22, bent from the upper portion of the torso protection portion 21 toward the lateral portion of the head 43 of the occupant 40, can immediately come into contact with the lateral portion of the turning head 43 of the occupant 40 to restrain the head 43. Also, even when the torso protection portion 21 having restrained the torso 41 of the occupant 40 moves to the inner side in the vehicle width direction and thereby the head protection portion 22 is going to be away from the occupant 40, the head protection portion 22 being bent at an acute angle relative to the torso protection portion 21 can remain in the vicinity of the head 43 of the occupant 40. The side airbag device 1 therefore can restrict the occupant 40 from moving to the inner side in the vehicle width direction while restraining the head 43 of the occupant 40.

The head protection portion 22 preferably comes into contact with the shoulder 45 of the occupant 40 in the inflated and deployed state. The contact between the head protection portion 22 and the shoulder 45 of the occupant 40 restricts the head protection portion 22 from moving to the inner side in the vehicle width direction. In other words, the contact restricts the head 43 of the occupant 40 from moving to the inner side in the vehicle width direction, so that the head 43 is easily restrained by the head protection portion 22.

Figure 5:
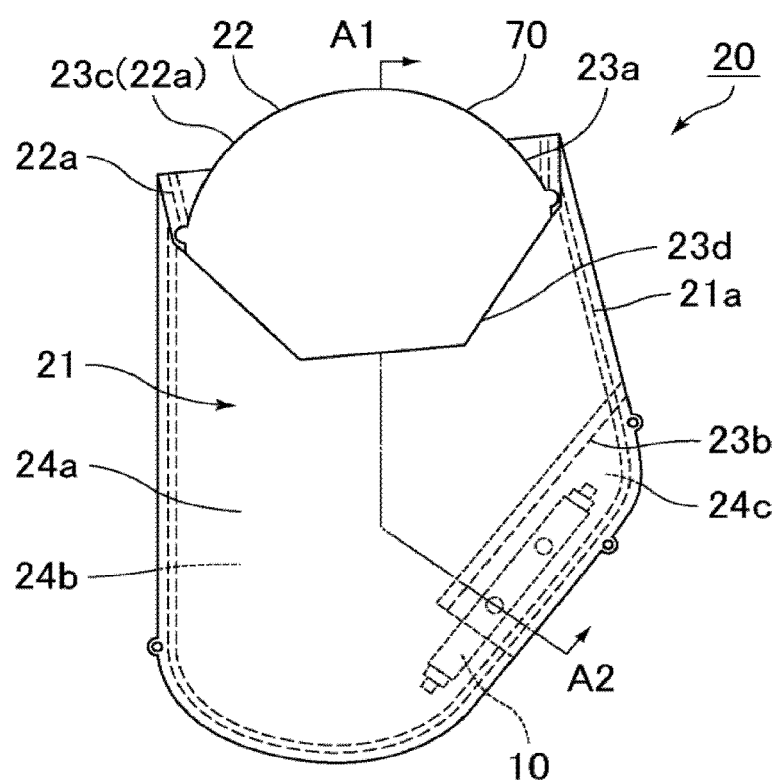
FIG. 5 is a schematic plan view of the airbag in the side airbag device of Embodiment 1 in a temporarily deployed state without inflating from the folded state before the inflation and deployment.
Figure 6:
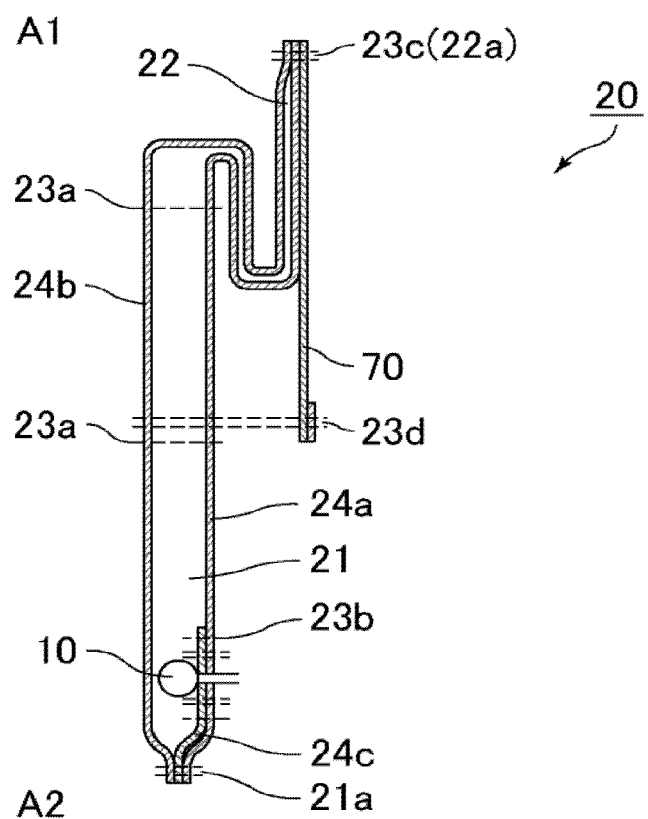
FIG. 6 is a schematic cross-sectional view of a portion corresponding to the line A1-A2 in FIG. 5.

The airbag 20 is described in more detailed below with reference to FIG. 5 and FIG. 6 as well. FIG. 5 is a schematic plan view of the airbag in the side airbag device of Embodiment 1 in a temporarily deployed state without inflating from the folded state before the inflation and deployment. FIG. 5 shows a state viewed from the occupant 40 side and also the rough position of the inflator 10. FIG. 6 is a schematic cross-sectional view of a portion corresponding to the line A1-A2 in FIG. 5.

The airbag 20 is a single bag including the torso protection portion 21 and the head protection portion 22 which are formed continuously. Specifically, as shown in FIG. 5 and FIG. 6, the airbag 20 is composed of a base fabric piece 24*a* and a base fabric piece 24*b*. The peripheries of the base fabric piece 24*a* and the base fabric piece 24*b* are joined with each other along the join line 21*a* and the join line 22*a*. The base fabric piece 24*a* and the base fabric piece 24*b* are joined with each other also along a join line 23*a*. Also, a base fabric piece 24*c* is provided in the vicinity of the inflator 10 so as to protect the airbag 20 from the high-temperature gas immediately after being generated from the inflator 10. The base fabric piece 24*c* is joined with the base fabric piece 24*a* and the base fabric piece 24*b* along the join line 21*a* and a join line 23*b*, for example.

The base fabric piece 24*a*, the base fabric piece 24*b*, and the base fabric piece 24*c* are each made of, for example, a piece of cloth formed by weaving yarn such as yarn of nylon 66 or yarn of polyethylene terephthalate. The surfaces of the base fabric piece 24*a*, the base fabric piece 24*b*, and the base fabric piece 24*c* may be coated with an inorganic substance such as silicon in order to improve the heat resistance and the airtightness, for example.

The bag shape of the airbag 20 may be formed by joining the peripheries of base fabric pieces (the base fabric piece 24*a* and the base fabric piece 24*b* in FIG. 5 and FIG. 6) to one another or by folding one base fabric piece in half and joining the peripheries of the overlaid portions of the base fabric piece. The joining of the base fabric piece(s) may be performed by any technique, such as sewing, bonding, welding, or any combination thereof.

The airbag 20 is provided with a tether 70 configured to be positioned on the occupant 40 side surface of the airbag in the inflated and deployed state. A first end of the tether 70 is attached to the tip portion of the head protection portion 22 and a second end of the tether 70 is attached to the middle portion of the torso protection portion 21. Specifically, as shown in FIG. 5 and FIG. 6, the first end of the tether 70 is joined with the tip portion of the head protection portion 22 (the tip portions of the base fabric piece 24*a* and the base fabric piece 24*b* defining the head protection portion 22) along a join line 23*c* (which is also a part of the join line 22*a*). The second end of the tether 70 is joined with the middle portion of the torso protection portion 21 (the middle portions of the base fabric piece 24*a* and the base fabric piece 24*b* defining the torso protection portion 21) along a join line 23*d*.

As shown in FIG. 6, the length of the tether 70 between the first end and the second end is shorter than the length of the airbag 20 between the tip portion of the head protection portion 22 and the middle portion of the torso protection portion 21. The lengths of the airbag 20 and the tether 70 satisfying the above relationship causes, in the inflated and deployed state, the tether 70 to pull the head protection portion 22 toward the torso protection portion 21. This makes the head protection portion 22 more easily bendable at an acute angle relative to the torso protection portion 21. Also, the tether 70 is attached to a position between the torso protection portion 21 and the head protection portion 22, and thus is positioned in a space beside the arm 44 and the shoulder 45 of the occupant 40 in the inflated and deployed state as shown in FIG. 4. As a result, when the torso protection portion 21 restrains the torso 41 of the occupant 40 moving toward the airbag 20, the arm 44 or the shoulder 45 of the occupant 40 pushes the tether 70. This shortens the direct distance between the first end of the tether 70 and the second end of the tether 70, further bending the head protection portion 22. Thus, even when the torso protection portion 21 having restrained the torso 41 of the occupant 40 moves to the inner side in the vehicle width direction and thereby the head protection portion 22 is going to be away from the occupant 40, the head protection portion 22 is bent in so as to be capable of restraining the head 43 of the occupant 40.

Also, preferably, in the inflated and deployed state of the airbag 20, the contact between the tether 70 and the occupant 40 and the shortened direct distance between the first end of the tether 70 and the second end of the tether 70 further bend the head protection portion 22 against the torso protection portion 21, and the further bending inhibits gas flow between the head protection portion 22 and the torso protection portion 21. The "further bending" means that the degree of bending is higher than the degree of bending of the head protection portion 22 without the tether 70. The term "inhibit" means that the amount of gas flow is smaller than the amount of gas flow without the tether 70, preferably that the amount of gas flow is zero. As shown in FIG. 4, when the arm 44 or the shoulder 45 of the occupant 40 pushes the tether 70 and the degree of bending of the head protection portion 22 relative to the torso protection portion 21 becomes high, the connection portion between the head protection portion 22 and the torso protection portion 21 tends to be narrowed. Thus, the gas flow holes provided in the connection portion and communicating the internal portion of the head protection portion 22 and the internal portion of the torso protection portion 21 can be blocked. Inhibiting gas flow between the torso protection portion 21 and the head protection portion 22 restricts the gas from escaping to the other air chamber when the airbag 20 receives the occupant 40. The internal pressure of the airbag 20 therefore increases when the airbag 20 is squashed as a result of receiving the occupant 40, thus increasing the restraining force to the occupant.

The tether 70 may be formed from one base fabric piece as shown in FIG. 6 or may be a laminate of base fabric pieces. The base fabric piece(s) defining the tether 70 is/are made of, for example, a piece of cloth formed by weaving yarn such as yarn of nylon 66 or yarn of polyethylene terephthalate. The surface(s) of the base fabric piece(s) may be coated with an inorganic substance such as silicon in order to improve the heat resistance and the airtightness, for example.

Figure 7:
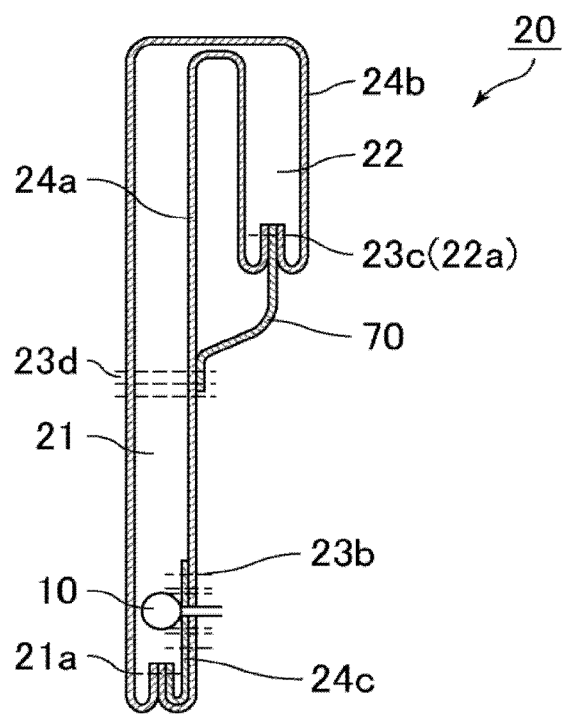
FIG. 7 is a schematic cross-sectional view showing the tether attached to the airbag in a mode different from the mode shown in FIG. 6.

The tether 70 may be attached to the airbag 20 in a mode different from the mode shown in FIG. 6. FIG. 7 is a schematic cross-sectional view showing the tether attached to the airbag in a mode different from the mode shown in FIG. 6. The mode as shown in FIG. 7 is obtainable by joining the peripheries of the base fabric piece 24a and the base fabric piece 24b with the first end of the tether 70 sandwiched between the base fabric piece 24a and the base fabric piece 24b, turning the resulting workpiece inside out, and attaching the second end of the tether 70 to the airbag 20.

The torso protection portion 21 preferably lifts the arm 44 of the occupant 40 during the inflation and deployment. Lifting the arm 44 of the occupant 40 by the torso protection portion 21 brings the arm 44 between the torso protection portion 21 and the head protection portion 22. Thereby, the head protection portion 22 having restrained the head 43 of the occupant 40, even when going to turn in the downward direction, is supported by the arm 44 of the occupant 40 lifted by the torso protection portion 21 and thus tends to restrain the head 43.

Embodiment 2

Hereinafter, a side airbag device of Embodiment 2 of the present invention is described with reference to the drawings. The side airbag device of Embodiment 2 is similar to the side airbag device of Embodiment 1 except for the configuration of the airbag. The same features therefore will not be elaborated upon here.

(Before Inflation and Deployment)

The state of the airbag 20 before inflation and deployment is as described above with reference to FIG. 1 and FIG. 2.

(Occupant Restraint)

Figure 8:
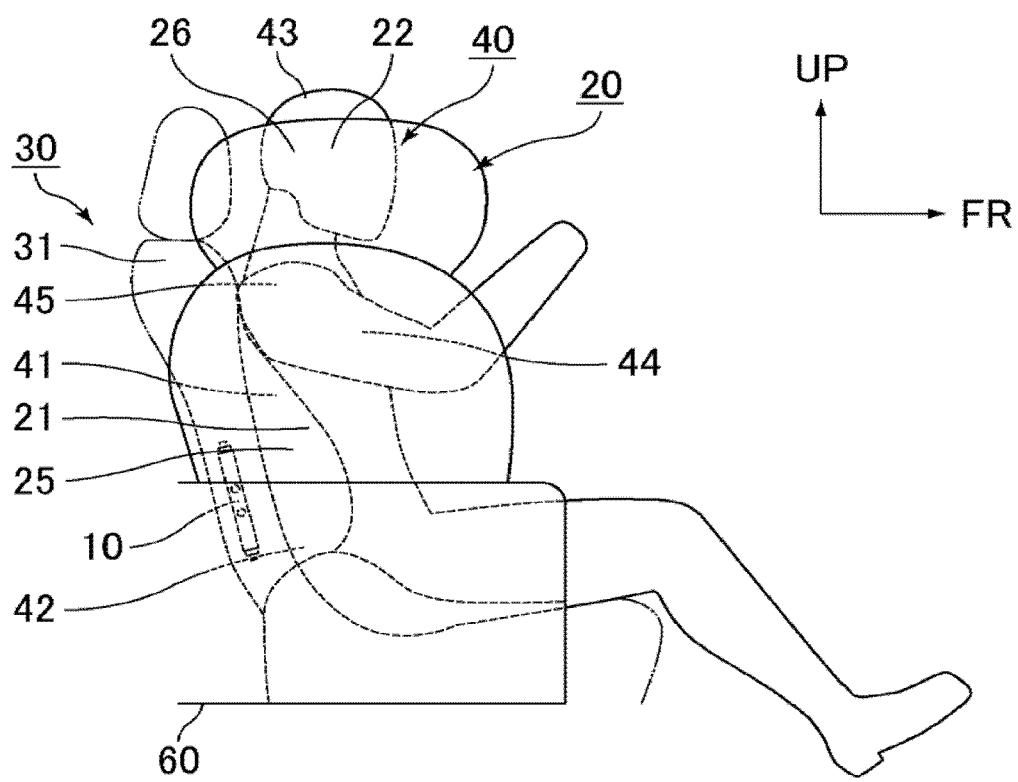
FIG. 8 is a schematic side view of a side airbag device of Embodiment 2 when an occupant is restrained by an airbag.
Figure 9:
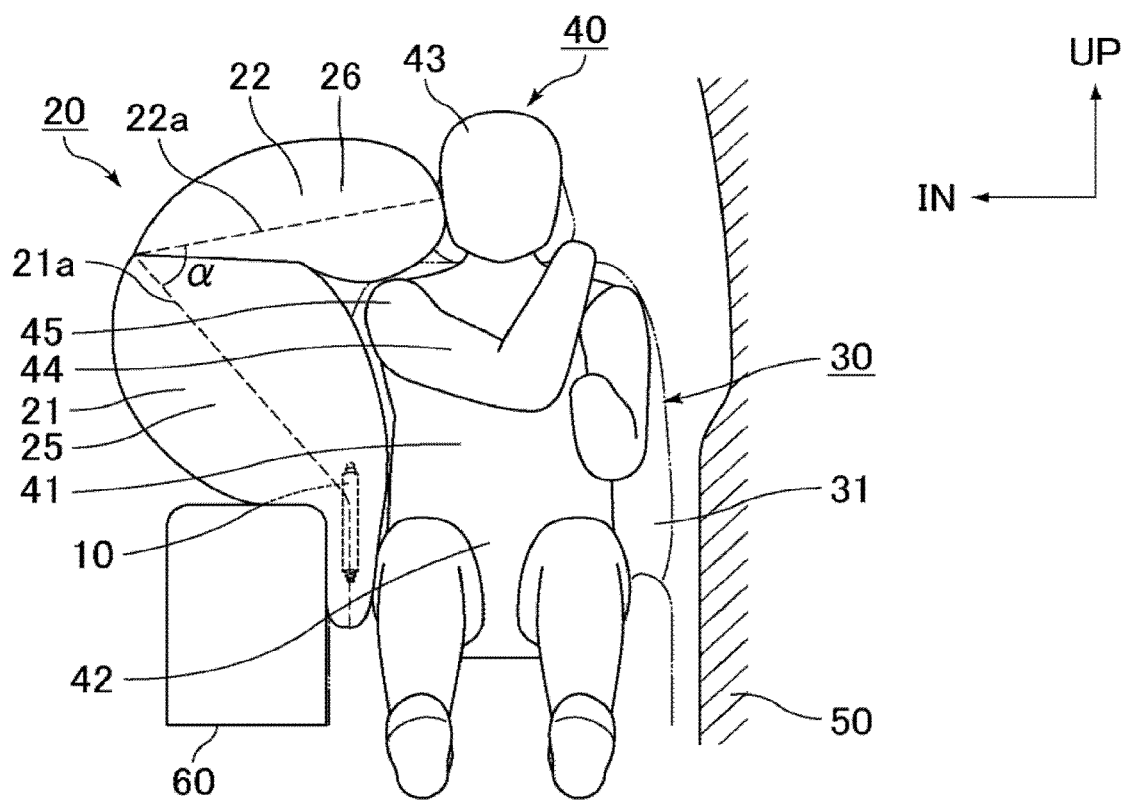
FIG. 9 is a schematic front view of the side airbag device of Embodiment 2 when an occupant is restrained by the airbag.

FIG. 8 is a schematic side view of a side airbag device of Embodiment 2 when an occupant is restrained by an airbag. FIG. 9 is a schematic front view of the side airbag device of Embodiment 2 when an occupant is restrained by the airbag.

When a vehicle has a lateral collision with an obstacle (e.g., another vehicle), specifically, when an obstacle collides with a vehicle sidewall opposing the vehicle sidewall 50 in the vehicle width direction (when the vehicle seat 30 is the driver's seat, the vehicle body portion on the outer side in the vehicle width direction relative to the passenger seat) and the inflator 10 is activated, the gas generated by the inflator 10 is introduced into the airbag 20 and the airbag 20 inflates while unfolded. The force applied from the inflated airbag 20 then tears open the outer layer of the seatback 31. Thereby, as shown in FIG. 8 and FIG. 9, the airbag 20 inflates and deploys in a space above the console box 60 and beside the occupant 40 seated in the vehicle seat 30 to protect the lateral portion of the occupant 40.

In a lateral collision of a vehicle, the airbag 20 inflates and deploys to form the torso protection portion 21 and the head protection portion 22.

Figure 10:
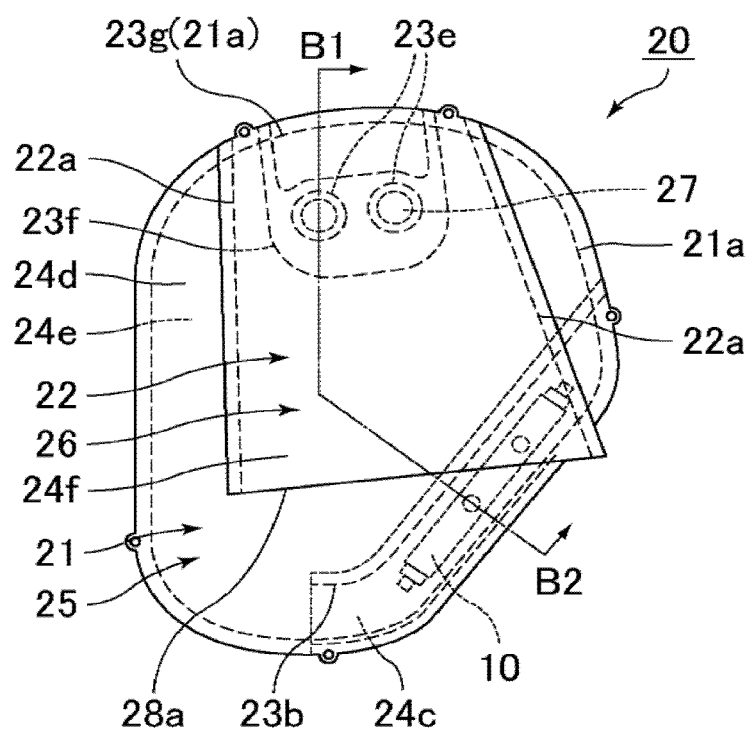
FIG. 10 is a schematic plan view of the airbag in the side airbag device of Embodiment 2 in a temporarily deployed state without inflating from the folded state before inflation and deployment.
Figure 11:
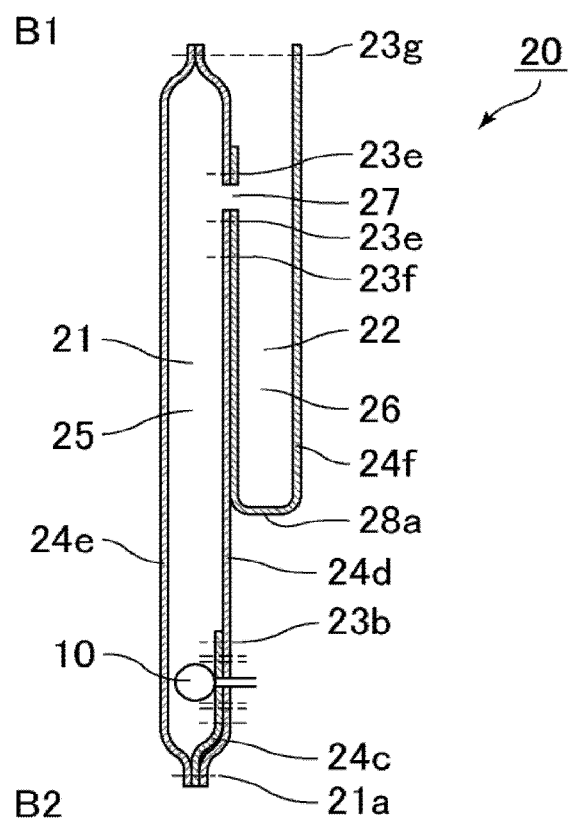
FIG. 11 is a schematic cross-sectional view of a portion corresponding to the line B1-B2 in FIG. 10.

The airbag 20 is described in detail below with reference to FIG. 10 and FIG. 11 as well. FIG. 10 is a schematic plan view of the airbag in the side airbag device of Embodiment 2 in a temporarily deployed state without inflating from the folded state before inflation and deployment. FIG. 10 shows a state viewed from the occupant 40 side and also the rough position of the inflator 10. FIG. 11 is a schematic cross-sectional view of a portion corresponding to the line B1-B2 in FIG. 10.

As shown in FIG. 10 and FIG. 11, the airbag 20 is provided with a main bag 25 which defines the torso protection portion 21, a sub bag 26 which defines the head protection portion 22, and gas flow holes 27 which communicate the main bag 25 and the sub bag 26.

The main bag 25 is composed of a base fabric piece 24d and a base fabric piece 24e. The peripheries of the base fabric piece 24d and the base fabric piece 24e are joined with each other along the join line 21a. The base fabric piece 24d is provided with holes that function as the gas flow holes 27 in the airbag 20. Also, the base fabric piece 24c is provided in the vicinity of the inflator 10 so as to protect the main bag 25 from the high-temperature gas immediately after being generated from the inflator 10. The base fabric piece 24c is joined with the base fabric piece 24d and the base fabric piece 24e along the join line 21a and the join line 23b, for example.

The base fabric piece 24d and the base fabric piece 24e are each made of, for example, a piece of cloth formed by weaving yarn such as yarn of nylon 66 or yarn of polyethylene terephthalate. The surfaces of the base fabric piece 24d and the base fabric piece 24e may be coated with an inorganic substance such as silicon in order to improve the heat resistance and the airtightness, for example.

The bag shape of the main bag 25 may be formed by joining the peripheries of base fabric pieces (the base fabric piece 24d and the base fabric piece 24e in FIG. 10 and FIG. 11) to one another or by folding one base fabric piece in half and joining the peripheries of the overlaid portions of the base fabric piece. The joining of the base fabric piece(s) may be performed by any technique, such as sewing, bonding, welding, or any combination thereof.

Figure 12:
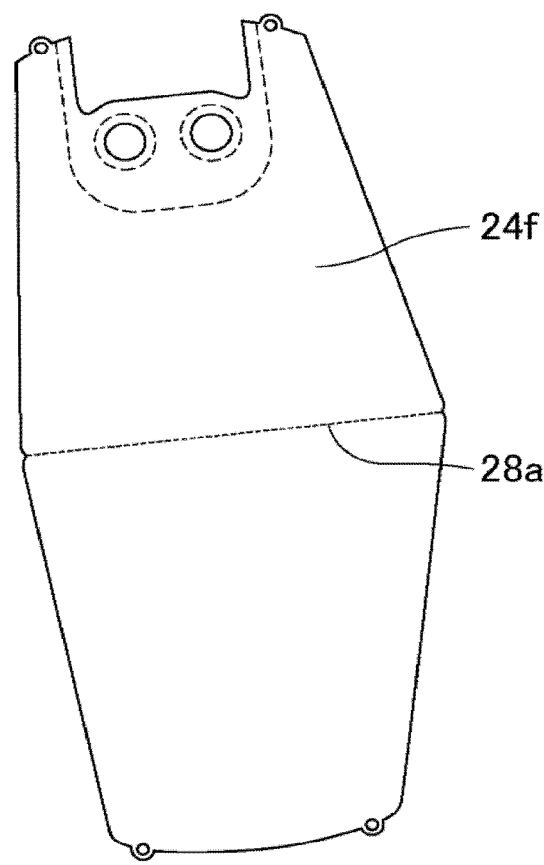
FIG. 12 is a schematic plan view of a base fabric piece defining the sub bag shown in FIG. 10.

FIG. 12 is a schematic plan view of a base fabric piece defining the sub bag shown in FIG. 10. The sub bag 26 is defined by a base fabric piece 24f as shown in FIG. 12. The base fabric piece 24f is provided with holes that function as the gas flow holes 27 in the airbag 20.

The base fabric piece 24f is made of, for example, a piece of cloth formed by weaving yarn such as yarn of nylon 66 or yarn of polyethylene terephthalate. The surface of the base fabric piece 24f may be coated with an inorganic substance such as silicon in order to improve the heat resistance and the airtightness, for example.

An end portion of the base fabric piece 24f (the end portion provided with the holes), which is referred to as the base end portion, is joined with the upper end portion (the end portion provided with the holes) of the main bag 25 with the holes superimposed with each other along a join line 23e and a join line 23f. The base fabric piece 24f is folded in half along a return line 28a and the peripheries of the overlaid portions of the base fabric piece 24f are joined along the join line 22a. The base fabric piece 24d and the base fabric piece 24e defining the main bag 25 and the base fabric piece 24f folded in half are joined with each other along a join line 23g (which is also a part of the join line 21a). Thus, the sub bag 26 is formed and the gas flow holes 27 communicating the main bag 25 and the sub bag 26 are provided.

Since the airbag 20 in the present embodiment has the configuration described above, when a vehicle has a lateral collision with an obstacle and the inflator 10 is activated, the gas generated by the inflator 10 is introduced into the main bag 25 and the main bag 25 inflates while unfolded. The force applied from the inflated main bag 25 and the sub bag 26 then tears open the outer layer of the seatback 31. Thereby, as shown in FIG. 8 and FIG. 9, the main bag 25 inflates and deploys in a space beside the torso 41 of the occupant 40 and, simultaneously, gas is introduced from the inside of the main bag 25 to the inside of the sub bag 26 through the gas flow holes 27 so that the sub bag 26 inflates while unfolded. Thus, the sub bag 26 inflates and deploys between the upper portion of the shoulder 45 of the occupant 40 and the lateral portion of the head 43 of the occupant 40.

As shown in FIG. 10 and FIG. 11, the sub bag 26 is fixed to the upper end portion of the main bag 25 with the base end portion of the sub bag surrounding the gas flow holes 27. Also, in the airbag 20 in the folded state before the inflation and deployment, the sub bag 26 is overlaid with the main bag 25 from the upper end portion of the main bag 25 to the middle portion on the occupant side of the main bag 25. This configuration of the sub bag 26 allows the sub bag 26 to inflate and deploy on the occupant 40 side of the main bag 25 and above the main bag 25 toward the head 43 of the occupant 40. The sub bag 26 is also bent at an acute angle relative to the main bag 25 in the inflated and deployed state.

In the present embodiment, a part of the base end portion of the sub bag 26 (the part of the sub bag 26 defining the boundary with the main bag 25 in the inflated and deployed state) is also the join line 23g along which the sub bag 26 is fixed to the periphery of the main bag 25. As shown in FIG. 10, the join line 23g corresponds to the portion where the base end portion of the sub bag 26 is joined with the main bag 25 along the periphery of the main bag 25 and also corresponds to a part of the join line 21a along which the base fabric piece 24d and the base fabric piece 24e defining the main bag 25 are joined with each other. Since the part of the base end portion of the sub bag 26 is the join line 23g, the portion of the inflated sub bag 26, which is closer to the periphery of the sub bag 26 than the gas flow holes 27 and the join line 23e are, and the upper end portion of the main bag 25 can be prevented from pushing each other, so that the sub bag 26 is stably fixed to the main bag 25.

Also in the present embodiment, another part of the base end portion of the sub bag 26 is the join line 23f along which the sub bag 26 is fixed to the main bag 25 on the middle portion side of (below) the gas flow holes 27. The angle formed by the main bag 25 and the sub bag 25 in the inflated and deployed state depends on the position of the join line 23f. When the sub bag 26 in the airbag 20 in the folded state before the inflation and deployment is overlaid with the main bag 25 from the upper end portion of the main bag 25 to the middle portion on the occupant 40 side of the main bag 25, the angle formed by the main bag 25 and the sub bag 26 in the inflated and deployed state is more obtuse as the join line 23f comes closer to the peripheries of the main bag 25 and the sub bag 26 (as the join line 23f is positioned higher), while the angle formed by the main bag 25 and the sub bag 26 in the inflated and deployed state is more acute as the join line 23f comes closer to the middle portion of the main bag 25 (as the join line 23f is positioned lower). Thus, providing the join line 23f on the middle portion side of the gas flow holes 27 allows control of the angle of the sub bag 26 relative to the main bag 25 in the inflated and deployed state to an acute angle. The length from the join line 23g (21a) of the peripheries of the main bag 25 and the sub bag 26 to the middle portion side part of the join line 23f is preferably half or more the length of the main bag 25 in the vehicle front-rear direction.

Figure 13:
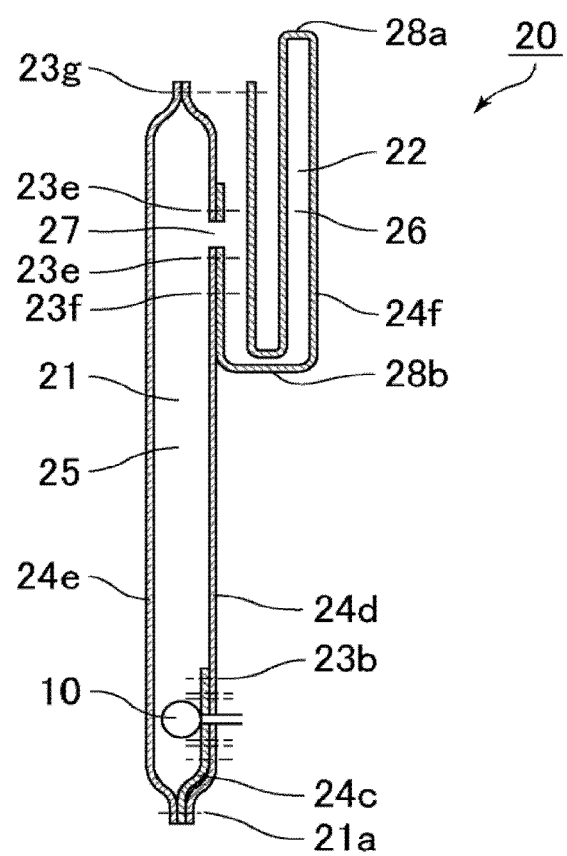
FIG. 13 is a schematic cross-sectional view showing a state where the sub bag shown in FIG. 11 is folded back toward an occupant along the vehicle front-rear direction.

The sub bag 26 in the airbag 20 in the folded state before the inflation and deployment is preferably folded back toward the occupant 40 along a return line 28b, i.e., along the vehicle front-rear direction, as shown in FIG. 13. FIG. 13 is a schematic cross-sectional view showing a state where the sub bag shown in FIG. 11 is folded back toward an occupant along the vehicle front-rear direction. The sub bag 26, folded back in the vehicle front-rear direction, more easily inflates and deploys toward the head 43 of the occupant 40 without inflating and deploying downwardly. As a result, the sub bag 26 can more easily restrain the head 43.

The bag shape of the sub bag 26 may be formed by folding one base fabric piece (the base fabric piece 24f in FIG. 10 and FIG. 11) in half and joining the peripheries of the overlaid portions of the base fabric piece or by joining the peripheries of base fabric pieces to one another. The joining of the base fabric piece(s) may be performed by any technique, such as sewing, bonding, welding, or any combination thereof.

One gas flow hole 27 may be provided, but a plurality of (two in FIG. 10) gas flow holes 27 is preferably provided. With the plurality of gas flow holes 27, the amount of gas flow from the main bag 25 to the sub bag 26 increases, so that the sub bag 26 inflates and deploys faster toward the head 43 of the occupant 40. As a result, the sub bag 26 more easily restrains the head 43.

The gas flow holes 27 each preferably have a circular shape as shown in FIG. 10.

In Embodiment 1 and Embodiment 2, other components of the side airbag device 1 can appropriately be components similar to those in known side airbag devices.

The present invention is not limited to the contents described in Embodiments 1 and 2. The configurations described in Embodiments 1 and 2 may be deleted, supplemented, modified, or combined as appropriate within the spirit of the present invention.

Embodiment 1 and Embodiment 2 each disclose a sub bag bendable at an acute angle relative to the main bag in the inflated and deployed state. However, the configuration of Embodiment 2 can achieve a certain effect of restricting an occupant from moving to the inner side in the vehicle width direction while restraining the head of the occupant even when the sub bag 26 is not bendable at an acute angle relative to the main bag 25 in the inflated and deployed state. In other words, in Embodiment 2, the sub bag 26 is fixed to the upper end portion of the main bag 25 with the base end portion of the sub bag 26 surrounding the gas flow holes 27 and, in the airbag 20 in the folded state before the inflation and deployment, the sub bag 26 is overlaid with the main bag 25 from the upper end portion of the main bag 20 to the middle portion on the occupant 40 side of the main bag 25 and is further folded back toward the occupant 40 in the vehicle front-rear direction. This configuration allows the sub bag 26 to inflate and deploy on the occupant 40 side of the main bag 25 and above the main bag 25 toward the head 43 of the occupant 40 without inflating and deploying downwardly. Thus, the above effect can be achieved regardless of the angle of the sub bag 26 relative to the main bag 25.

Embodiments 1 and 2 describe the case where the inflator 10 is activated when an obstacle collides with a vehicle sidewall opposing the vehicle sidewall 50 in the vehicle width direction. However, the inflator 10 may be activated when an obstacle collides with the vehicle sidewall 50. In this case, when the occupant 40 moves to the inner side in the vehicle width direction due to a cause such as swinging back after the occupant 40 is restrained by a side airbag inflated and deployed on the outer side in the vehicle width direction relative to the occupant 40 seated in the vehicle seat 30, the airbag 20 can restrict the occupant 40 from moving to the inner side in the vehicle width direction while restraining the head 43 of the occupant 40.

REFERENCE SIGNS LIST

1: side airbag device
10: inflator
20: airbag
21: torso protection portion
21a: join line of base fabric piece defining torso protection portion
22: head protection portion
22a: join line of base fabric piece defining head protection portion
23a, 23b, 23c, 23d, 23e, 23f, 23g: join line
24a, 24b, 24c, 24d, 24e, 24f: base fabric piece
25: main bag
26: sub bag
27: gas flow hole
28a, 28b: return line
30: vehicle seat
31: seatback (backrest)
40: occupant (world side impact dummy)
41: torso
42: hip
43: head
44: arm
45: shoulder
50: vehicle sidewall
60: console box
70: tether
α: angle formed by join line of base fabric piece defining torso protection portion and join line of base fabric piece defining head protection portion

The invention claimed is:

1. A side airbag device inflatable and deployable in a space beside an occupant seated in a vehicle seat, the side airbag device comprising:
an inflator configured to generate a gas; and
a bag-shaped airbag inflatable and deployable in response to the gas upon activation of the inflator to protect a lateral portion of the occupant, wherein
the airbag includes a torso protection portion inflatable and deployable in a space beside a torso of the occupant and a head protection portion configured to be provided above the torso protection portion and inflatable and deployable between an upper portion of a shoulder of the occupant and a lateral portion of a head of the occupant, and
the head protection portion is bendable such that an acute angle is formed between a join line of the head protection portion and a join line of the torso protection portion.

2. The side airbag device according to claim 1, wherein the head protection portion is configured to come into contact with the shoulder of the occupant in the inflated and deployed state of the airbag.

3. The side airbag device according to claim 1, wherein the airbag is a single bag including the torso protection portion and the head protection portion which are formed continuously,
the airbag is provided with a tether configured to be positioned on an occupant side surface of the airbag in the inflated and deployed state of the airbag,
a first end of the tether is attached to a tip portion of the head protection portion and a second end of the tether is attached to a middle portion of the torso protection portion, and
a length of the tether between the first end and the second end is shorter than a length of the airbag between the tip portion of the head protection portion and the middle portion of the torso protection portion.

4. The side airbag device according to claim 3, wherein in the inflated and deployed state of the airbag, contact between the tether and the occupant further bends the head protection portion against the torso protection portion, and the further bending inhibits gas flow between the head protection portion and the torso protection portion.

5. The side airbag device according to claim 1, wherein the airbag is provided with a main bag which defines the torso protection portion, a sub bag which defines the head protection portion, and
the main bag and the sub bag communicate with each other using a gas flow hole,
the sub bag is fixed to an upper end portion of the main bag with a base end portion of the sub bag surrounding the gas flow hole and, in the airbag in a folded state before the inflation and deployment, the sub bag is overlaid with the main bag from the upper end portion of the main bag to a middle portion on an occupant side of the main bag.

6. The side airbag device according to claim 5, wherein a part of the base end portion of the sub bag is a join line which is closer to the middle portion of the main bag than the gas flow hole and along which the sub bag is fixed to the main bag, and
an angle formed by the main bag and the sub bag depends on the join line.

7. The side airbag device according to claim 5, wherein the sub bag of the airbag in the folded state before the inflation and deployment is folded back toward the occupant along a vehicle front-rear direction.

8. The side airbag device according to claim 5, wherein a part of the base end portion of the sub bag is a join line along which the sub bag is fixed to a periphery of the main bag.

9. The side airbag device according to claim 1, wherein the torso protection portion is configured to lift an arm of the occupant during the inflation and deployment.

10. The side airbag device according to claim 1, wherein the acute angle is closest to the occupant.

11. The side airbag device according to claim 1, wherein the head protection portion is closest to the occupant.

12. The side airbag device according to claim 5, wherein
the main bag and the sub bag are different bag-shaped bags,
the main bag inflates and deploys in a space beside the shoulder, chest, abdomen, and hip of the occupant, and
the sub bag inflates and deploys between the upper portion of the shoulder of the occupant and the lateral portion of the head of the occupant.

* * * * *